United States Patent
Zabbal

(10) Patent No.: US 12,123,895 B2
(45) Date of Patent: Oct. 22, 2024

(54) METHOD OF DETERMINING DIMENSIONS OF FEATURES OF A SUBSURFACE TOPOGRAPHY, SCANNING PROBE MICROSCOPY SYSTEM AND COMPUTER PROGRAM

(71) Applicant: Nearfield Instruments B.V., Rotterdam (NL)

(72) Inventor: Paul Zabbal, Amsterdam (NL)

(73) Assignee: Nearfield Instruments B.V., Rotterdam (NL)

( * ) Notice: Subject to any disclaimer, the term of this patent is extended or adjusted under 35 U.S.C. 154(b) by 13 days.

(21) Appl. No.: 17/916,622

(22) PCT Filed: Apr. 1, 2021

(86) PCT No.: PCT/NL2021/050216
§ 371 (c)(1),
(2) Date: Oct. 3, 2022

(87) PCT Pub. No.: WO2021/201684
PCT Pub. Date: Oct. 7, 2021

(65) Prior Publication Data
US 2023/0143659 A1  May 11, 2023

(30) Foreign Application Priority Data
Apr. 3, 2020 (NL) ..................................... 2025275

(51) Int. Cl.
*G01Q 60/24* (2010.01)
*G01N 29/06* (2006.01)
(Continued)

(52) U.S. Cl.
CPC ............. *G01Q 60/32* (2013.01); *G01N 29/06* (2013.01); *G01Q 30/04* (2013.01)

(58) Field of Classification Search
None
See application file for complete search history.

(56) References Cited

U.S. PATENT DOCUMENTS

2006/0037401 A1  2/2006  Shekhawat et al.
2019/0154636 A1*  5/2019  Sadeghian Marnani ....................
 G01Q 40/00
(Continued)

FOREIGN PATENT DOCUMENTS

EP  3258275 A1  12/2017
EP  3349002 A1  7/2018

OTHER PUBLICATIONS

International Search Report and Written Opinion—PCT/NL2021/050216—mailing date Jul. 10, 2021.

*Primary Examiner* — Eliza W Osenbaugh-Stewart
(74) *Attorney, Agent, or Firm* — Banner & Witcoff, Ltd.

(57) ABSTRACT

The present document relates to a method to determine dimensions of features of a subsurface topography of a sample, the features having a spatial periodicity. The subsurface topography is obtained using scanning probe microscopy. The method includes obtaining measurement values of an acoustic output signal in at least N locations and generating a location dependent subsurface topography signal. The method further comprises providing an autocorrelation matrix by performing a cross-correlation of the subsurface topography signal in respect of each further location to yield the autocorrelation matrix having size N*N. Thereafter, the method includes performing an Eigenvalue decomposition for obtaining Eigenvalues of the matrix, and selecting a subset of Eigenvalues having the largest values. From these a frequency estimation function is constructed and at least one output value indicative of the spatial periodicity is (Continued)

obtained therefrom. The document also describes a scanning probe microscopy system and a computer program product.

15 Claims, 9 Drawing Sheets

(51) Int. Cl.
  *G01Q 30/04* (2010.01)
  *G01Q 60/32* (2010.01)

(56) References Cited

U.S. PATENT DOCUMENTS

2019/0310284 A1* 10/2019 van Es ................... G01N 29/22
2022/0205953 A1*  6/2022 Piras .................... G01N 29/348

* cited by examiner

METHOD OF DETERMINING DIMENSIONS OF FEATURES OF A SUBSURFACE TOPOGRAPHY, SCANNING PROBE MICROSCOPY SYSTEM AND COMPUTER PROGRAM

CROSS-REFERENCE TO RELATED APPLICATIONS

This application is a U.S. National Stage application under 35 U.S.C. § 371 of International Application PCT/NL2021/050216 (published as WO 2021/201684 A1), filed Apr. 1, 2021 which claims the benefit of priority to Application NL 2025275, filed Apr. 2, 2020. Benefit of the filing date of these prior applications is hereby claimed. Each of these prior applications is hereby incorporated by reference in its entirety.

FIELD OF THE INVENTION

The present invention is directed at a method of determining one or more dimensions of subsurface features from a measurement of subsurface topography of a sample, wherein the subsurface topography includes one or more features having a spatial periodicity, wherein the measurement of the subsurface topography is obtained using a scanning probe microscopy system, and wherein the method comprises: applying, using a transducer, an acoustic input signal to the sample; sensing in a plurality of locations on a surface of the sample an acoustic output signal using a probe, the probe including a cantilever and a probe tip, wherein the probe tip is in contact with the surface, wherein the acoustic output signal is representative of acoustic waves responsive to the acoustic input signal that are measurable at the surface; and obtaining, for each location of the plurality of locations, a measurement value of the acoustic output signal.

BACKGROUND

Acoustic scanning probe microscopy (SPM) methods provide a promising technique to enable investigation of subsurface topographies of samples of different kinds. For example, an acoustic AFM method may be applied to study subsurface features of a biological sample, without destroying the sample itself. Other examples relate to the investigation of buried topographies of semiconductor samples to identify faults or malfunction during manufacturing, or assess the manufacturing quality, e.g. to ensure that the dimensions are correctly processed.

Roughly, these acoustic SPM methods may be divided in terms of the physical principle that governs the subsurface sensing method. Low frequency acoustic SPM applies acoustic signals up to e.g. 200 megahertz (MHz) and is based on the principle that at these frequencies the response of the sample is inter alia governed by elasticity of the material of the sample underneath the surface. There where a feature is present underneath the surface, the elasticity is slightly different such as to obtain a different response in contact stiffness of the probe tip of the SPM. Hence, features underneath the surface may be felt, similar to like an object underneath a pillow may be felt. The depth range of detection however is limited, such that structures buried deeply (e.g. at depth higher than 200 micrometers) underneath the surface cannot be found in this way.

On the other hand, high frequency acoustic SPM operates at signal typically above 500 MHz and above up to e.g. 100 gigahertz (GHz) and is based on the principle of scattering of these signals at features buried within the sample. The probe of the SPM is typically not sensitive to signals at these high frequencies. Therefore, in order to measure these signals, the acoustic output signal must be converted down to a lower frequency in order to enable sensing. This is done by applying a heterodyne acoustic signal, consisting of two high frequencies (within the range indicated above) having a difference frequency that is within the operative detection range of the probe. The output signal then includes a frequency component at the difference frequency, which enables sensing of its characteristics.

Although the above sensing method enable the detection of subsurface features, and also allows visualizing these, it is still difficult to obtain sufficient accuracy in the determination of dimensions of detected features. Noise and artefacts may complicate accurate determination. The ability to accurately determine dimensions is important in certain applications, such as detection of critical dimensions or overlay error in semiconductor element manufacturing methods.

SUMMARY OF THE INVENTION

It is an object of the present invention to provide a method of determining dimensions of subsurface features that at least partly overcomes the above disadvantages in order to increase accuracy in determination of dimensions of subsurface features.

To this end, there is provided herewith a method of determining one or more dimensions of subsurface features from a measurement of subsurface topography of a sample, wherein the measurement of the subsurface topography is obtained using a scanning probe microscopy system, and wherein the method comprises: applying, using a transducer, an acoustic input signal to the sample; sensing in a plurality of locations on a surface of the sample an acoustic output signal using a probe, the probe including a cantilever and a probe tip, wherein the probe tip is in contact with the surface, wherein the acoustic output signal is representative of acoustic waves responsive to the acoustic input signal that are measurable at the surface; and obtaining, for each location of the plurality of locations, a measurement value of the acoustic output signal, and providing a location dependent subsurface topography signal based on the measurement values of at least a part of the plurality locations, the at least part of the plurality locations including N locations; wherein the subsurface features include one or more features having a spatial periodicity, and wherein the method further comprises: providing an autocorrelation matrix by performing, for each location of the at least part of the plurality of locations, a cross-correlation of the subsurface topography signal in respect of each further location of the at least part of the plurality of locations using a location-shifted version of the subsurface topography signal which is shifted over distance equal to the distance between the respective location and the further location, such as to yield the autocorrelation matrix having a size N*N; performing an Eigenvalue decomposition of the autocorrelation matrix for obtaining a plurality of Eigenvalues, and selecting from the Eigenvalues a subset of Eigenvalues having the largest values; constructing a frequency estimation function from the subset of Eigenvalues; and obtaining, from the frequency estimation function, at least one output value being indicative of the spatial periodicity.

The present invention is based on the insight that subsurface topographies in many cases comprise periodicity or regularity that may be exploited in order to more accurately determine dimensions of such subsurface features. This is for example true in the semiconductor industry. For example, subsurface topographies of a wafer in many situations at least include a periodicity in terms of the regular pattern of devices arranged side by side, with dicing lanes in between to enable separation of individual structures. Moreover, in many situations, the topography of subsurface layers of individual devices includes one or more regular or periodic structures. Such periodicity may be used to apply analysis techniques that enable to more accurately determine dimensions, even in the presence of noise or artefacts.

In the present invention, a multiple signal classification (MUSIC) algorithm is applied in order to obtain the characteristics of such periodicity. Having these characteristics enables to more accurately determine the dimensions of features or structures. The MUSIC algorithm generates an autocorrelation matrix by cross-correlating the subsurface topography signal with itself. By determining the Eigenvalues, the largest Eigenvalues are considered to be indicative of periodic structures in the subsurface topography whereas the smallest Eigenvalues are considered to originate from noise and other disturbances. The method may include a ranking of the Eigenvalues, although this is not required. The system is able to immediately determine the largest Eigenvalues and calculate periodicity therefrom.

In some embodiments, the method includes a step of fitting at least one periodic function having a same periodicity as the spatial periodicity for which the at least one output value is indicative such as to obtain a fitted periodic function. Such a fit may be used to enable calculation of dimensions or modelling of the subsurface topography. The latter is useful in case the method is applied in a method for determining overlay or alignment errors, wherein the subsurface topography needs to be modelled and compared to the on-surface topography of the sample.

In some of these embodiments, the method further includes: calculating, for each location of the at least part of the plurality of locations and using the fitted periodic function, an expectation value of the acoustic output signal, such as to yield expectation values for at least said N locations; generating a cross-correlation matrix by performing, for each location of the at least part of the plurality of locations, a cross-correlation of the subsurface topography signal with each expectation value, such as to yield a cross-correlation matrix having a size N*N; performing an Eigenvalue decomposition of the cross-correlation matrix for obtaining a plurality of further Eigenvalues, and selecting from the further Eigenvalues a further subset of Eigenvalues having the largest values; constructing a further frequency estimation function from the further subset of Eigenvalues; and obtaining, from the further frequency estimation function, at least one further output value being indicative of the spatial periodicity. The additional iteration described above may be conducted one or more times in order to improve the determined spatial periodicity characteristics. Therefore, in accordance with some embodiments, the above method steps may be repeated one or more times to obtain an improved estimate of the spatial periodicity.

In some embodiments, the method comprises calculating the one or more dimensions of the subsurface features based on the determined spatial periodicity. In some embodiments, the dimensions include at least one of a group comprising: a pitch of a periodic structure, a width of a subsurface feature, line width roughness, critical dimension, feature spacing.

Furthermore, in some embodiments, wherein the method includes a step of fitting at least one periodic function, the method further includes using the fitted periodic function to determine one or more locations of at least one of a minimum, a maximum or a zero crossing of the fitted periodic function. For example, in some embodiments, the fitted periodic function comprises a sine fit.

In some particular embodiments, the method is applied in a method of monitoring overlay or alignment during a semiconductor manufacturing process. In these embodiments, the method is a method of monitoring at least one of an overlay or an alignment between a first and a second layer of a semiconductor substrate using a scanning probe microscopy system, wherein the method comprises: scanning the substrate surface, using a probe tip of the scanning probe microscopy system, in at least one scanning direction, for obtaining a surface topography and a subsurface topography, wherein for obtaining the subsurface topography a method in accordance with any one or more of the preceding claims is performed, which further yields an output value being indicative of the spatial periodicity; the method further including: generate at least one pattern template and matching the measured surface topography with the at least one pattern template for determining a first candidate pattern to represent the measured first topography in the at least one scanning direction; obtaining a second candidate pattern to represent the measured subsurface topography in the at least one scanning direction wherein the second candidate pattern is obtained by fitting at least one periodic function having a same periodicity as the spatial periodicity; determining, from the first candidate pattern, one or more feature characteristics of device features in the first topography; determining, from the second candidate pattern, one or more feature characteristics of device features in the second topography; and calculating, using the determined feature characteristics of the first and second topography, one or more overlay parameters or alignment parameters. Based on the periodicity determined, a topography candidate pattern may be generated that accurately follows the subsurface topography, and which enables the determination of overlay or alignment errors during the process.

In a second aspect of the invention, there is provided a scanning probe microscopy system configured for carrying out a method in accordance with any one or more of the preceding claims, the system comprising a substrate carrier for supporting a sample, the substrate carrier comprising a transducer for applying an acoustic input signal to the sample, the system further including a scan head comprising a probe, the probe including a cantilever and a probe tip, wherein at least one of the substrate carrier or the scan head comprises at least one actuator configured for scanning the probe relative to the sample such that the probe tip is in contact with the sample, and wherein the system further comprises a sensor for obtaining an acoustic output signal representative of acoustic waves responsive to the acoustic input signal that are measurable at the surface of the sample, for enabling to obtain a subsurface topography signal containing measurement values of at least N locations on the surface of the sample, wherein the system further comprises or is communicatively connected to an analysis system, and wherein the analysis system comprises a memory and a controller, wherein the memory is configured for storing instructions which when loaded into the memory enable the controller to determine one or more dimensions of subsurface features having a spatial periodicity, wherein to perform said determination the instructions enable the controller to perform the steps of: providing an autocorrelation matrix by performing, for each location of the at least part of the plurality of locations, a cross-correlation of the subsurface topography signal in respect of each further location of the at least part of the plurality of locations using a location-shifted version of the subsurface topography signal which is shifted over distance equal to the distance between the respective location and the further location, such as to yield the autocorrelation matrix having a size N*N; performing an Eigenvalue decomposition of the autocorrelation matrix for obtaining a plurality of Eigenvalues, and selecting from the Eigenvalues a subset of Eigenvalues having the largest values; constructing a frequency estimation function from the subset of Eigenvalues; and obtaining, from the frequency estimation function, at least one output value being indicative of the spatial periodicity.

In a third aspect of the invention, there is provided a computer program product comprising instructions which, when loaded into a memory of an analysis system associated with a scanning probe microscopy system, enable a controller of the analysis system to perform a method according to the first aspect.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
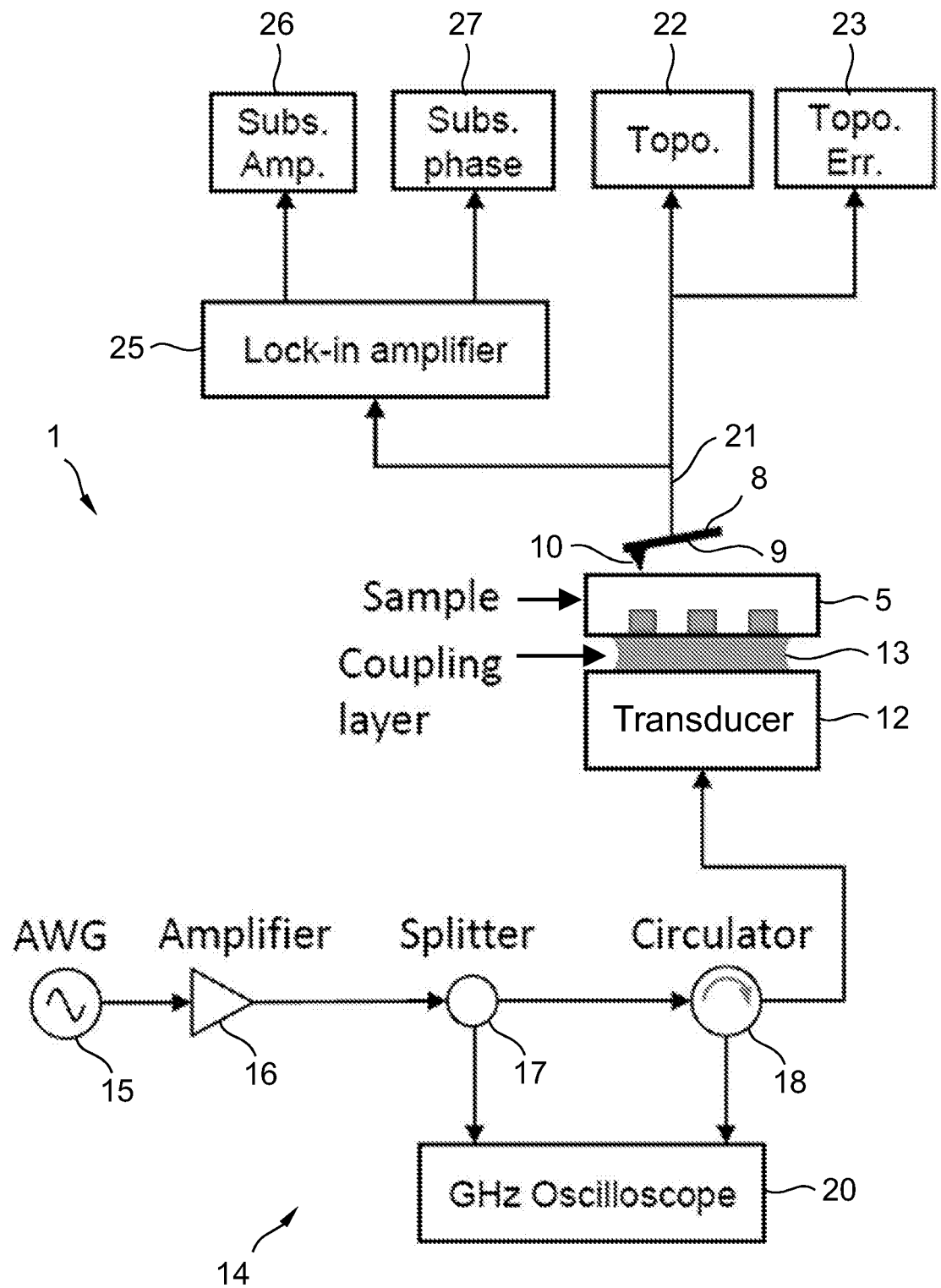
FIG. 1 schematically illustrates a setup of a system in accordance with an embodiment of the present invention, for carrying out a method in accordance with an embodiment.

The propagation of mechanical waves (ultrasound) in a material is by nature dependent on the mechanical characteristics of the material, such as density, material geometry, elastic moduli, etc. The analysis of the propagation of these waves has therefore been studied in the literature for decades to trace back non-destructively to the properties of a propagation medium, whether in the medical field (e.g. ultrasound) or in the non-destructive testing of inert materials.

Developments in the semiconductor industry are typically governed by Moore's law which predicts that the number of transistors in a dense integrated circuit doubles every two years, which brings significant technological challenges as there is a demand for even smaller and smaller integrated circuits comprising of complex multilayered devices.

Overlay metrology is the control of pattern-to-pattern alignment in the semiconductor industry. Misalignment of any kind can cause short circuits and connection failures. An example of a device configuration 75 wherein overlay measurements are needed is shown FIG. 5. In this device configuration 75 illustrated, the plain rectangles 76 represent the surface features, the dashed rectangles 77 the subsurface features. Current metrology techniques are based on optical methods, however, as there could be opaque layer in the device, these methods are limited. The present aim is to detect, using ultrasound non-destructive evaluation method, subsurface features 77 buried in a structure, and estimate the overlay between surface features 76 and subsurface features 77. This method can be used for both defect inspection and process control.

FIG. 1 schematically illustrates a scanning probe microscopy (SPM) system that is suitable for applying a method in accordance with the present invention. The SPM system of FIG. 1 enables a sample 5, which may be fixed to a sample carrier (not shown), to be investigated using the a scanning probe microscopy technique. The system 1 is suitable for carrying out both surface and subsurface topography measurements. The system 1 comprises a probe 8 consisting at least of a cantilever 9 and a probe tip 10, typically mounted on a scan head (not shown) with actuators for bringing the probe tip 10 in contact with the surface of sample 5 and scanning the probe 8 relative to the sample 5. Optionally, the SPM system may be suitable for operating in various operating modes, such as contact, non-contact or tapping mode, as will be appreciated by the skilled person. In order to investigate the sample 5, the probe tip 10 is brought in contact with the surface of the sample 5, for example for measuring a surface topography or a subsurface topography. The sensing of subsurface features in the sample 5 to enable subsurface topography analysis is performed using a transducer 12 in contact with the sample 5, e.g. in the system 1 of FIG. 1 present underneath the sample 5. Although the system illustrated in FIG. 1 is based on bottom actuation, it is also possible to apply the present invention using a system based on top actuation, wherein the acoustic signal is applied from the top of the surface of sample 5. The transducer 12 may be operated in combination with sensing through the probe 8, as will be explained further below. The transducer 12 provides an acoustic signal that is applied to the sample 5. Thereto, a coupling layer 13 may be present to enable coupling of the acoustic signal into the sample. The coupling layer 13 may be a grease, a gel, or any other substance that enables efficient coupling of the acoustic signal into the sample 5. The transducer 12 underneath the sample 5, which provides the acoustic signal, may be connected to an acoustic generator 14.

In the example of FIG. 1, the acoustic generator 14 consists of an arbitrary waveform generator (AWG) 15 and an amplifier 16 providing a gigahertz acoustic input signal to a splitter 17. The splitter 17 provides a part of the signal to the oscilloscope 20. The rest of the signal is provided via the circulator 18 to the transducer 12. Any parts of the acoustic signal that is reflected by internal features in the sample may be received again via the transducer in circulator 18 which provides this part of the signal to the oscilloscope 20. The acoustic generator 14 is emitting a signal continuously at a probing frequency in the gigahertz range (GHz), modulated by the resonance frequency of the cantilever 9 in the kilohertz (kHz) range. The transducer 12 for example may have a diameter of 100 μm and may be fixed to a silicon delay line which is bigger and may have a thickness of 550 μm. This delay line is used to 'built-up' the plane-wave.

The cantilever 9 picks up motion on the surface of sample 5 induced by the plane-wave in response to the applied acoustic signal, as out-of-plane (vertical) displacements of the probe tip 10. Any motion of the probe tip 10 perpendicular to the surface of the sample 5 may be sensed using, for example, an optical sensor (not shown). The optical sensor may for example include an optical beam deflector that is common for SPM systems such as system 1. The optical sensor produces raw sensor data 21 from which four signal channels: the on-surface topography signal 22, the on-surface topography error signal 23, the subsurface amplitude signal 26 and the subsurface phase 27, may be obtained using an analyzer (not shown). The subsurface signals 26 and 27 are down-mixed from the sample-tip interaction using a heterodyne principle earlier described, and therefore locking amplifier 25 is used to extract the signals 26 and 27 at a specific resonance frequency. For this, prior to scanning, the frequency is determined/selected in order to maximize the Signal-to-Noise Ratio (SNR). Although this is not a strict requirement (as any shift—even no shift—are possible), while measuring the measurements may be performed with a certain degree shift (~30°-40°) to de-correlate the scattering from the AFM plane-movement. The system 1 illustrated in FIG. 1 enables to detect the surface topography of the sample 5 and additionally a subsurface topography. From both surface topography channels 22 and 23, no subsurface features can be observed. However, from the subsurface amplitude 26 and phase 27 signals, some scattering patterns are detected. Overlay and alignment errors may be detected by comparing the surface topography with the subsurface topography, as will be further explained below.

Figure 2:
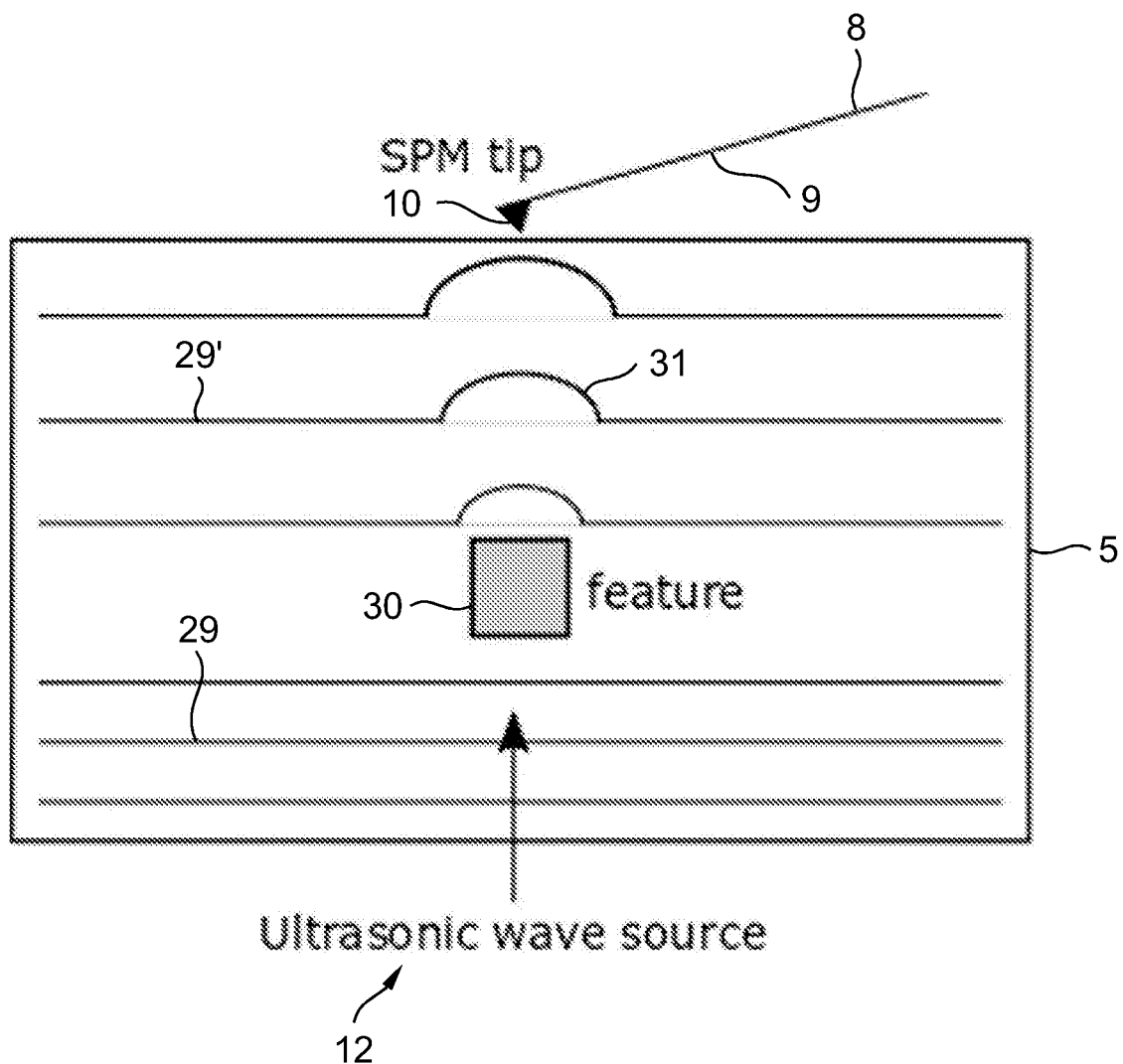
FIG. 2 schematically illustrates how subsurface device features are visualized using a scattering based subsurface scanning probe microscopy method, which may be applied using the system illustrated in FIG. 1.

FIG. 2 schematically illustrates the principle of subsurface topography measurements using an SPM system, for example system 1 as illustrated in FIG. 1. In the example, sensing is performed using an applied acoustic signal with a central frequency in the high frequency range (>500 MHz and gigahertz range) as explained below where the sensing mechanism is dominated by scattering, for example a central frequency at 1 GHz. The ultrasonic wave source 12 (the transducer 12 in FIG. 1) provides an acoustic input signal to the sample 5. The acoustic signal may be applied to any desired part of the sample 5, but in the present example it is applied to the bottom of the sample 5 opposite the sample surface. In case a feature 30 is present internally in the sample 5, the acoustic signal 29 is locally disturbed by the feature 30. Hence, downstream of the feature 30, a disturbance 31 will propagate to the surface of the sample 5. The acoustic signal 29', including any disturbances 31, can be sensed by the probe tip 10 of the probe 8.

Using SPM, subsurface topography measurements may be performed with acoustic input signals in various different frequency ranges. The sensing mechanism is different though, dependent on the frequency of the acoustic signal applied to the sample 5. For low frequencies, e.g. typically up to 200 MHz, the elastic properties of the material of sample 5 dominate and enable the sensing of subsurface features. In fact, at these frequencies, the subsurface features are typically 'felt' due to differences in elastic properties there where a subsurface feature is present. This can be derived from the output signal indicative of the motion of the probe tip 10 transverse to the surface of sample 5. At high frequencies of the acoustic input signal, typically above 500 MHz, the elastic properties no longer play a role due to the material of the sample 5 being inert to such frequencies. Instead, the acoustic signal 29 propagates through the sample 5 as illustrated in FIG. 2, and is scattered by obstructions encountered. In fact sensing at these frequencies is performed by measuring the acoustic signal received after it has propagated through the sample 5. The low frequency range elastic based sensing, although providing a good SNR for layers just below the surface of the sample 5, is limited to a relatively small penetration depth. The sensing method at these low range frequencies thus cannot be applied to perform topography measurements of deeper layers underneath the surface of the sample 5. The high frequency range scattering based sensing method is more suitable for sensing deeper layers underneath the surface of the sample 5. However, obtaining information on dimensions of subsurface features from these measurements is challenging, given the low SNR. The method of the present invention overcomes this, as will be explained below.

The sensitivity of the probe 8 to received vibrations is limited by its characteristics, such as the dimensions and design of the probe and its material. The probes resonance frequencies defining its operational range are typically far below the abovementioned acoustic frequencies (typically below 2 MHz), such that the abovementioned acoustic frequencies are outside this range. To enable sensing, the acoustic input signal 29 may be a heterodyne signal, consisting of two (or more) frequencies with a frequency difference which is within the operational range of the probe 8. The mixing of both frequencies created a signal component at the difference frequency, which can be sensed. Motion of the probe tip 10 is therefore affected by the acoustic signal 29' and the disturbances 31. As a result, by analyzing the motion of the probe tip 10 using locking amplifier 25 in FIG. 1, the subsurface amplitude 26 and subsurface phase 27 of the acoustic signal 29' may be determined, from which the subsurface topography can be derived.

Figure 5:
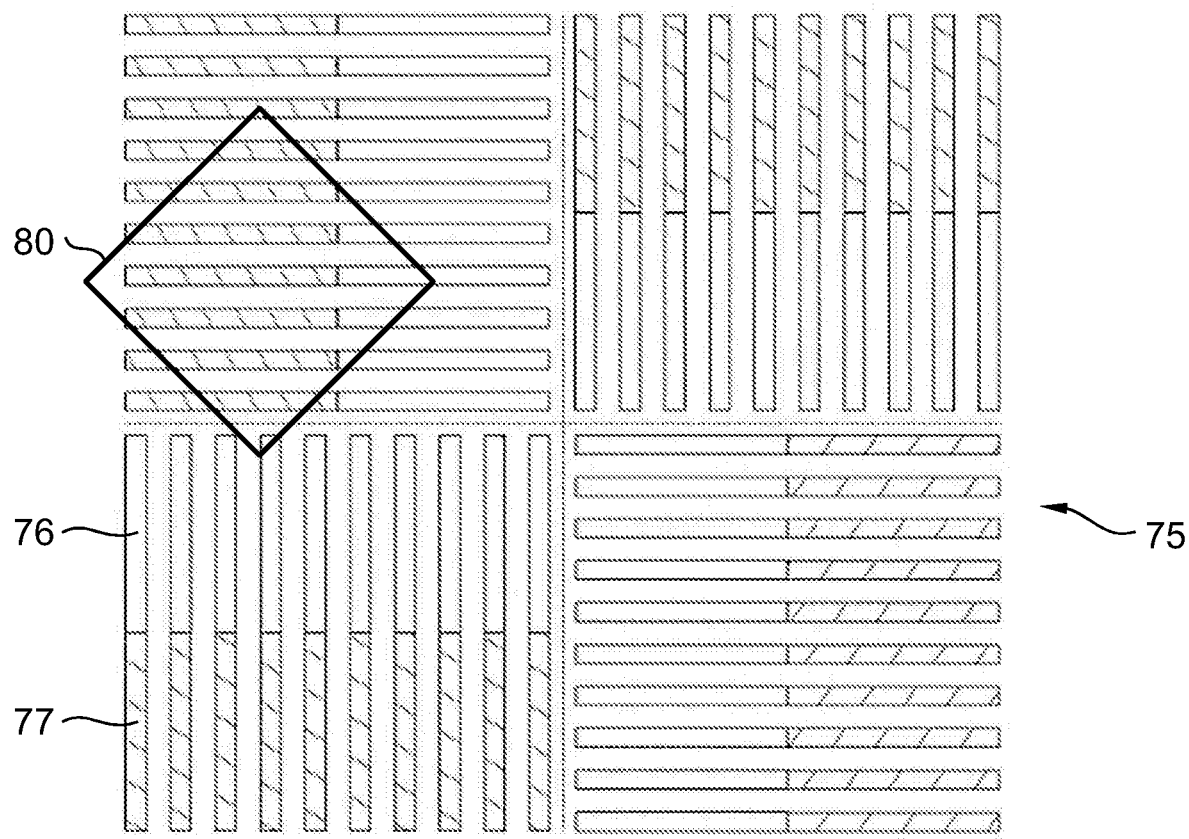
FIG. 5 schematically illustrates a semiconductor device configuration to be measured using a method in accordance with an embodiment of the invention.
Figure 6:
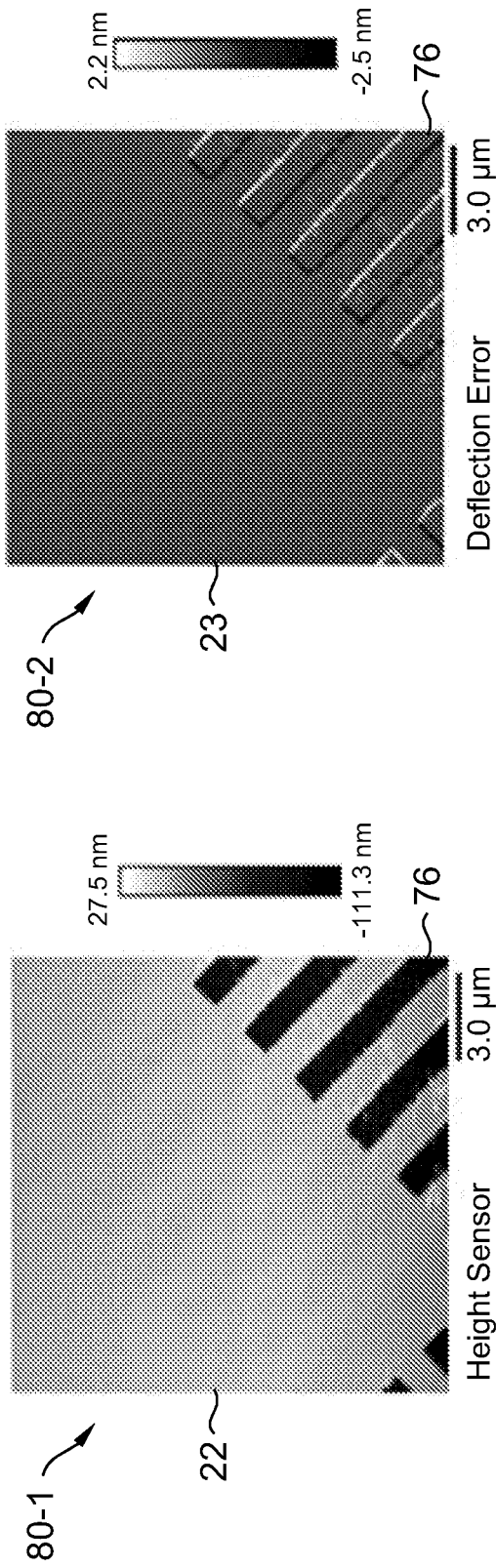
FIG. 6 provides visualizations of the four signal channels obtained for the topography and subsurface measurements.
Figure 6:
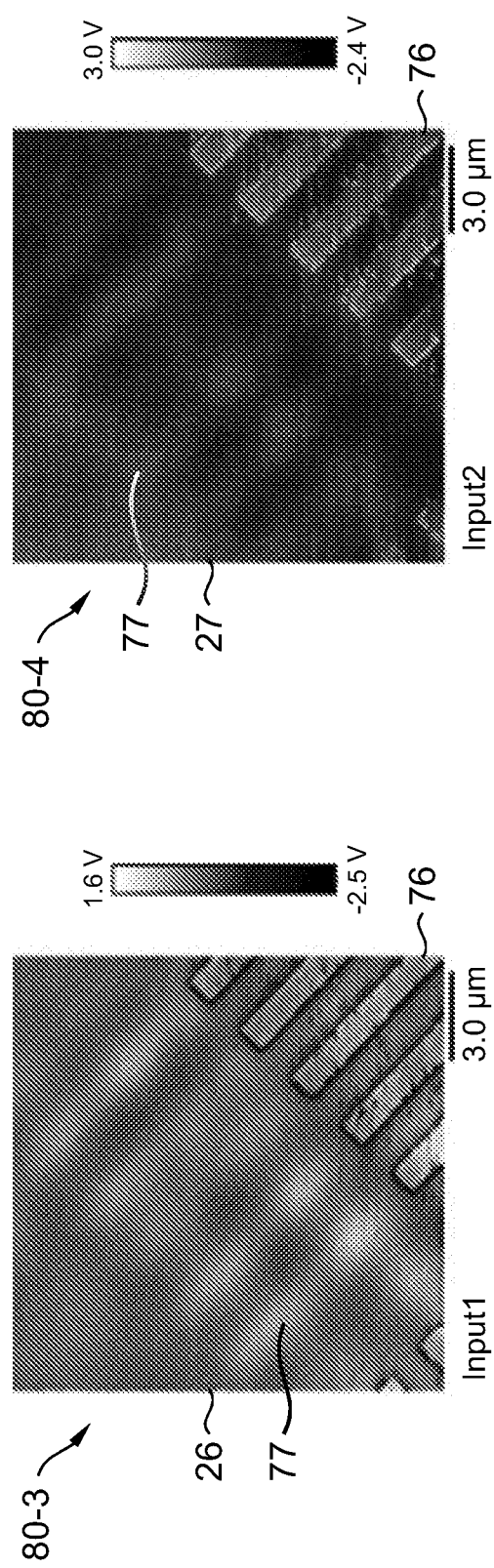

Considering the semiconductor device 75 of FIG. 5, as an example the surface area 80 of the device 75 has been scanned and analyzed. Visualizations of the four channels 22, 23, 26 and 27 are provided in FIG. 6 as 80-1, 80-2, 80-3 and 80-4. In 80-1, the topography signal 22 is visualized over the area sensed, indicating the bar shaped features 76 on the topography. In 80-2, the topography error signal 23 is visualized over the area sensed, also indicating the bar shaped features 76 on the topography. In 80-3, the subsurface amplitude signal 26 is visualized over the area sensed, again indicating the bar shaped features 76 on the topography and further vaguely showing the subsurface bar shaped features 77. In 80-4, the subsurface phase signal 27 is visualized over the area sensed, again indicating the bar shaped features 76 on the topography and further very vaguely showing the subsurface bar shaped features 77. The four visualized channels 22, 23, 26 and 27 in FIG. 6 may be used as input to a method in accordance with an embodiment of the invention in order to enable detection of the dimensions of the subsurface features (e.g. the bars 77).

Figure 3:
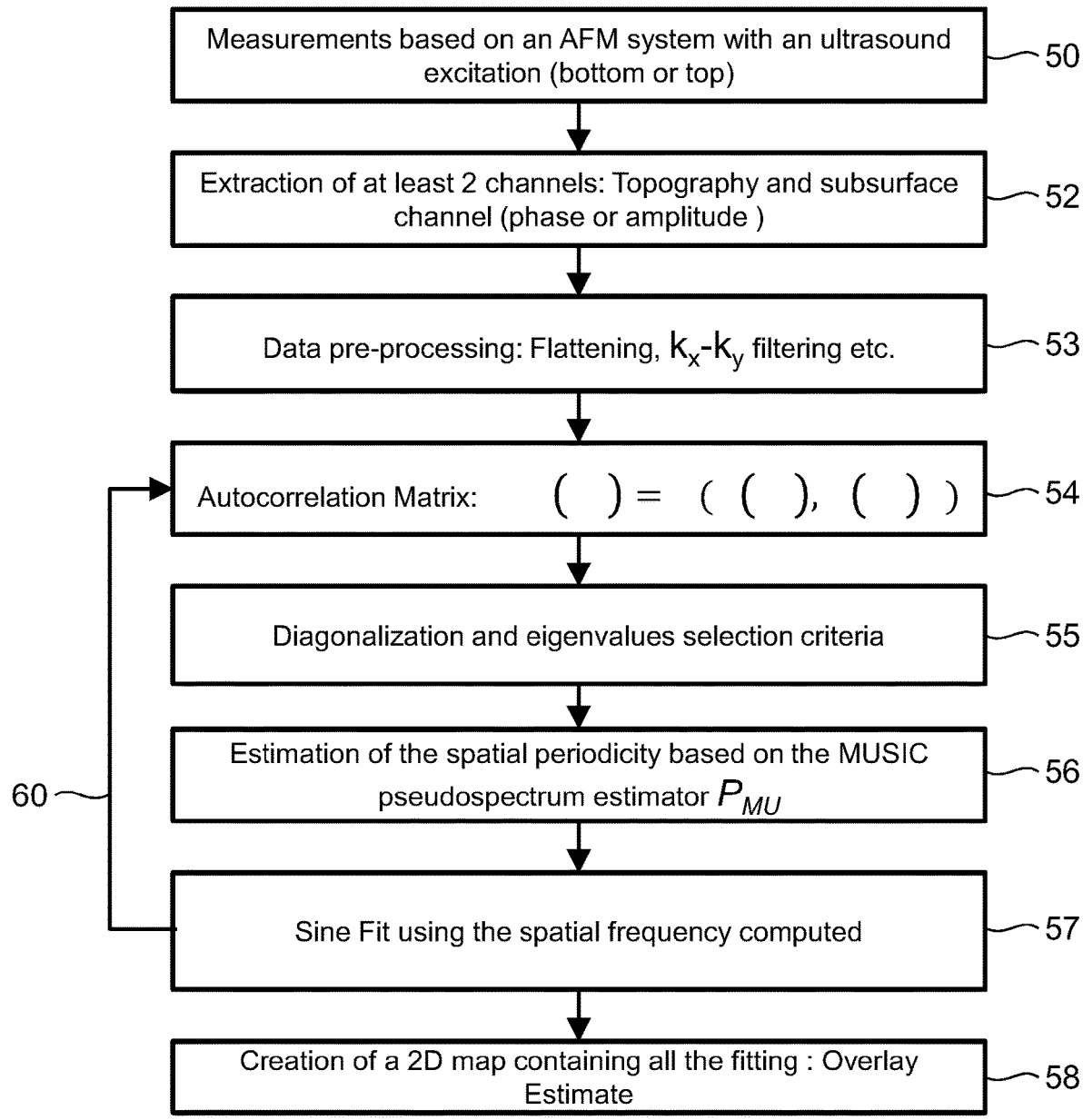
FIG. 3 schematically illustrates a method in accordance with an embodiment of the invention.

FIG. 3 schematically illustrates a data processing method for processing data from an atomic force microscopy system wherein ultrasound excitation has been performed in addition to topography measurements in order to determine subsurface features. The method may for example have been applied during manufacturing of a semi-conductor wafer that includes a plurality of semi-conductor devices. The application of scanning probe microscopy methods such as atomic force microscopy (AFM) enables to measure critical dimensions and determine overlay and alignment errors during manufacturing of the wafer. In an industrial process, this may be applied in order to perform a quality check, or in order to allow correction of the industrial process to guarantee the desired quality.

The method in FIG. 3 starts in step 50 wherein measurements are received from an AFM system that applies the ultrasound excitation method in order to identify or map subsurface features in addition to topography measurements on the surface of a substrate sample. For example, step 50 may be performed using the SPM system 1 of FIG. 1. Step 50 receives the raw data from the system 1, for example the raw data 21 obtained from the optical sensor of the system 1 and provides therefrom the four channels, e.g. the on-surface topography signal 22, the on-surface topography error signal 23, the subsurface amplitude signal 26 and the subsurface phase 27. For example, the visualized channels of FIG. 6 may be obtained. In step 52, at least two channels thereof are selected: at least one of the topography channels 22 or 23 and one of the subsurface channels 26 or 27. This is needed as the relevant information of the subsurface topography features 77 can be either in the subsurface amplitude channel 26 or the subsurface phase channel 27.

Figure 4A:
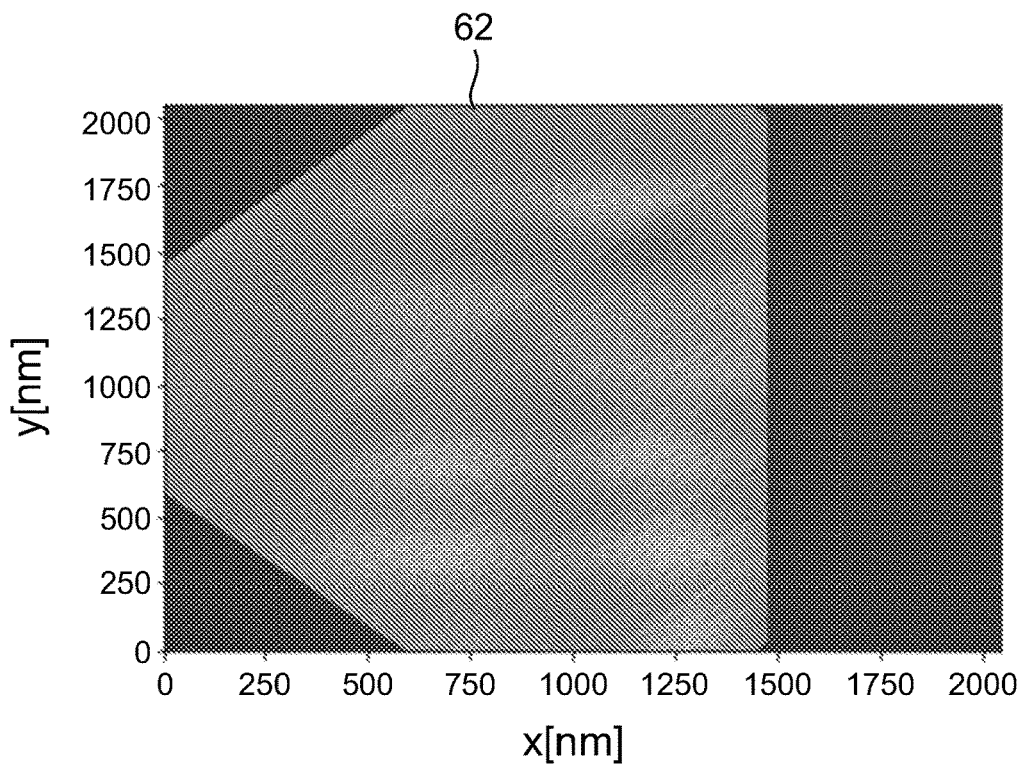
FIGS. 4A and 4B illustrate the results of a method of the present invention performed on a wafer.
Figure 4B:
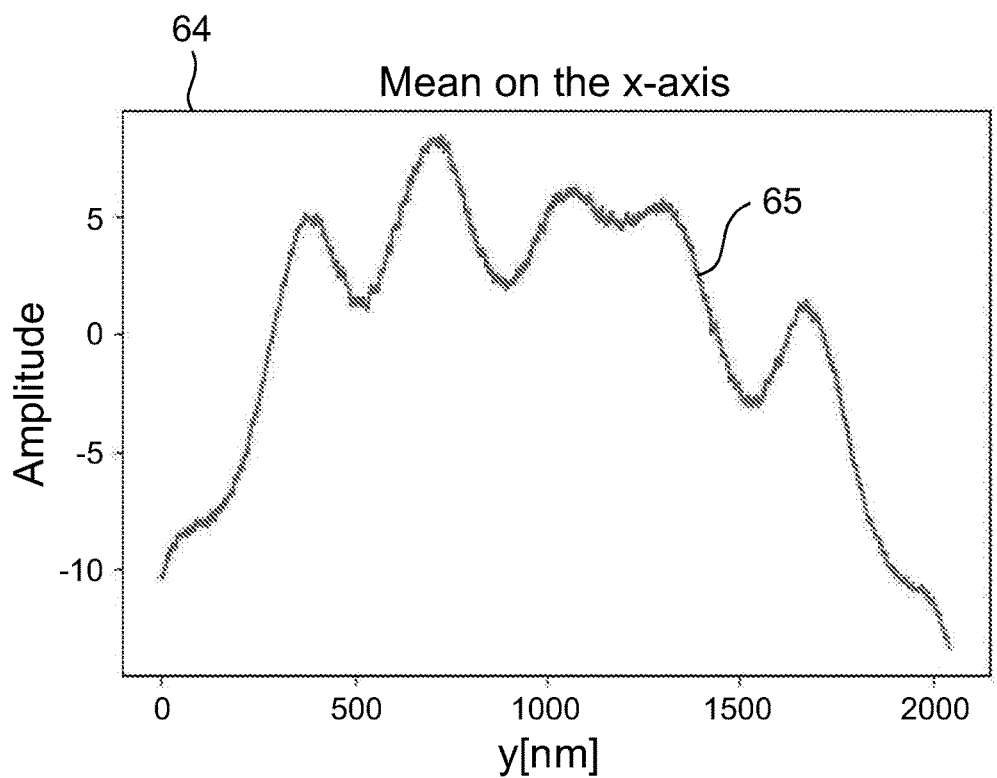

In step 53, the data obtained from the system 1 is preprocessed. Data pre-processing and cleaning are performed because, as it can be observed in FIG. 6, the signals can be quite noisy which can make the overlay extraction more complex. For example, a preprocessing step 53 may include steps such as flattening of the data, and $k_x$-$k_y$ filtering (i.e. any filtering in the wavenumber domain of the two-dimensional Fourier transform). After the preprocessing step 53, a location dependent measurement value map may be obtained from the data. An example thereof is shown in FIG. 4A, which shows an image 62 of a subsurface amplitude signal 26 like image 80-3 of FIG. 6. FIG. 4B shows a graph 64 of a signal column curve 65 at 1221 nanometer (nm) from the image of FIG. 4A. Considering FIGS. 4A and 4B, clearly, the scattering pattern is difficult to extract and it is not possible to estimate the subsurface features pitch and width without any additional processing.

In accordance with the present invention, to enable to perform an accurate estimation of dimensions of subsurface features, a location dependent subsurface topography signal will be obtained. This may be a one-dimensional or two-dimensional location dependent signal. Assuming, for the present example, a one-dimensional location dependent subsurface topography signal, this signal contains measurement values across a line or column over the topography. For example, the signal illustrated in the graph 64 of FIG. 4B. In some embodiments, a plurality of such one-dimensional location dependent subsurface topography signals may be obtained. For example, referring to the image 62 in FIG. 4A, a one-dimensional location dependent subsurface topography signal may be obtained for each column $x_i$ of interest with 500 nm<x<1350 nm. Denoting a two-dimensional location dependent subsurface topography signal as s(x,y), for each column $x_i$, the one-dimensional location dependent subsurface topography signal $s(x_i)$ will then provide the signal component (amplitude 26 or phase 27, whichever was selected in step 52) of the image containing the acoustic information. The one-dimensional signal $s(x_i)$ may consist of for example a total of N locations $y_i$ (measurement points).

Naturally, although the above has focused on the subsurface topography signal, the same may be done for the surface topography signal(s) 22 and/or 23. These signals may be taken along in each of the method steps 53, 54, 55, 56 and 57 below (even where this is not particularly mentioned below).

Using this location dependent subsurface topography signal, and assuming that the subsurface features include at least one or more features having a spatial periodicity, autocorrelation is applied in step 54 by calculating an autocorrelation matrix by performing, for each of the N locations $y_i$ for which measurement values are available, a cross-correlation of the subsurface topography signal $s(x_i)$ with respect to each other location $y_j$ of the same subsurface topography signal $s(x_i)$. Thus, for each point in the one dimensional location dependent subsurface topography signal $s(x_i)$, a cross correlation is calculated with a location shifted version of this same location dependent subsurface topography signal. The result of step 54 will provide an autocorrelation matrix $R_{xx}$ of dimensions N×N (with E the expected value and T the transpose):

$$R_{xx}(s(x_i))=E(s(x_i),s(x_i)^T) \quad \text{(eq. 1)}$$

Here, E Note that in FIG. 3, the autocorrelation matrix is denoted in a slightly different way (using a signal $R(x_p)$ for $x_p$, and applying the Hermitian $R(x_p)^H$).

As a skilled person may appreciate, an auto correlation matrix may be applied to identify periodicities in an arbitrary signal, and in the present invention it is applied to identify the periodicities in the location dependent subsurface topography signal. Furthermore, although step 54 has been explained for a one-dimensional location dependent subsurface topography signal, the same may be applied to a two-dimensional subsurface topography signal, i.e. a topography map. In the above, the autocorrelation may be applied on the one dimensional location dependent subsurface topography signals $s(x_i)$ associated with each of a plurality of columns $x_i$ in the area of interest (e.g. the area in image 4A where 500 nm<x<1350 nm). Considering 1≤i≤M for $x_i$, this would yield M different autocorrelation matrices. However, it is also possible to perform two-dimensional autocorrelation directly on the signal s(x,y) in the whole area at once.

Next, in step 55, the method consists of a step of Eigenvalue decomposition of the auto correlation matrix obtained. The autocorrelation matrix $R_{xx}$ is a Hermitian matrix, meaning it is possible to perform an eigendecomposition. It is then possible to rewrite the autocorrelation matrix based on its eigenvalues and eigenvectors such that:

$$R_{xx}(s(x_i))v(x_i)=\Delta(x_i)v(x_i) \quad \text{(eq. 2)}$$

With λ and v respectively its eigenvalues and eigenvectors. Step 55 may comprise a step of diagonalization in order to find the Eigenvalues of the autocorrelation matrix of step 54. If we sort the eigenvalues in descending order, it is possible to separate the eigenvectors in two sub-spaces: the ones corresponding to the signal (feature) sub-space, and the ones for the noise subspace. This would yield:

$$\forall x_i \lambda_j(x_i)v_j(x_i)=\Sigma_{n=1}^{N_s}\lambda_n(x_i)v_N(x_i)+\Sigma M_{=n_s+1}^{N_N}\lambda_m(x_i)$$
$$v_m(x_i) \quad \text{(eq. 3)}$$

wherein $N_s$ corresponds with the number of signal components (which is, in the example of FIG. 5 where the grating is perfectly periodic, $N_s=1$), and $N_N$ the total number of eigenvalues. Of course, it is not necessary to actually perform a sorting of the Eigenvalues. If the number of periodicities in the signal is known (as in the present example: 1), the $N_s$ number of largest eigenvalues may immediately be recognized from the set of Eigenvalues. In the present example, it would be sufficient to select the largest eigenvalue as being the eigenvalue associated with the periodicity of the design in FIG. 5, as there is only one periodicity. In other situations, a mix several features may give rise to multiple different periodicities. Hence, as input to the method, the number of known periodicities in the design could be provided to enable eigenvalue selection, based on the design blueprint. If this is not available, other selection criteria may likewise be applied, e.g. selecting eigenvalues that are significantly larger than the mean, or larger than a threshold, or at least larger than the average plus three times the standard deviation of the 50% smallest eigenvalues (i.e. identifying the outliers, while assuming a normal distribution of the eigenvalues associated with noisy signals). Various selection criteria may be applied here.

The signal sub-space and the noise-subspace are orthogonal. MUSIC algorithm is based on this hypothesis and a projection may be performed of the different eigenvectors corresponding to the noise in the signal sub-space. This projection should tend to 0 because of the orthogonality of the two sub-spaces. A pseudospectral estimator noted $P_{MU}$ may be defined as the inverse of this projection, which tends toward infinite at the signal location. In step 56, the peaks from this estimator are extracted to obtain the spatial component of the topography or the subsurface channel. The projector in this case can be a simple Fourier Transform (noted FT) projector:

$$\forall\ x_i,\ P_{MU}(x_i) = \frac{1}{\sum_{k=N_M+1}^{N_N} |FT\{v_k(x_i)\}|^2} \quad \text{(eq. 4)}$$

Instead, in some embodiments, other estimators defined from the autocorrelation matrix of a signal can be used, such as the maximum likelihood which gives less accurate results and is based on the projection of weighted eigenvectors by their eigenvalues:

$$\forall\ x_i,\ P_{ML}(x_i) = \frac{1}{\sum_{k=1}^{N_R} \frac{1}{\lambda_k} |FT\{v_k(x_i)\}|^2} \quad \text{(eq. 5)}$$

The invention is not limited to the abovementioned estimators, and alternative estimators may likewise be used to find periodicity characteristics, such as pitch, width or line width roughness (LWR) of the bars 77.

The above spatial periodicity determination steps give the pitch and the width of the different elements of the subsurface topography of sample 5. Moreover, as it can be performed on several traces, it can be used to estimate the Line Width Roughness (LWR) or defects in the sample 5. In all the different tests performed by the inventors, the pitch estimation error was 1 pixel off in the worst cases, meaning this dimension extraction based on spatial periodicity estimation has a high accuracy and could be employed at large scale, and for noisy data or environment.

Figure 7A:
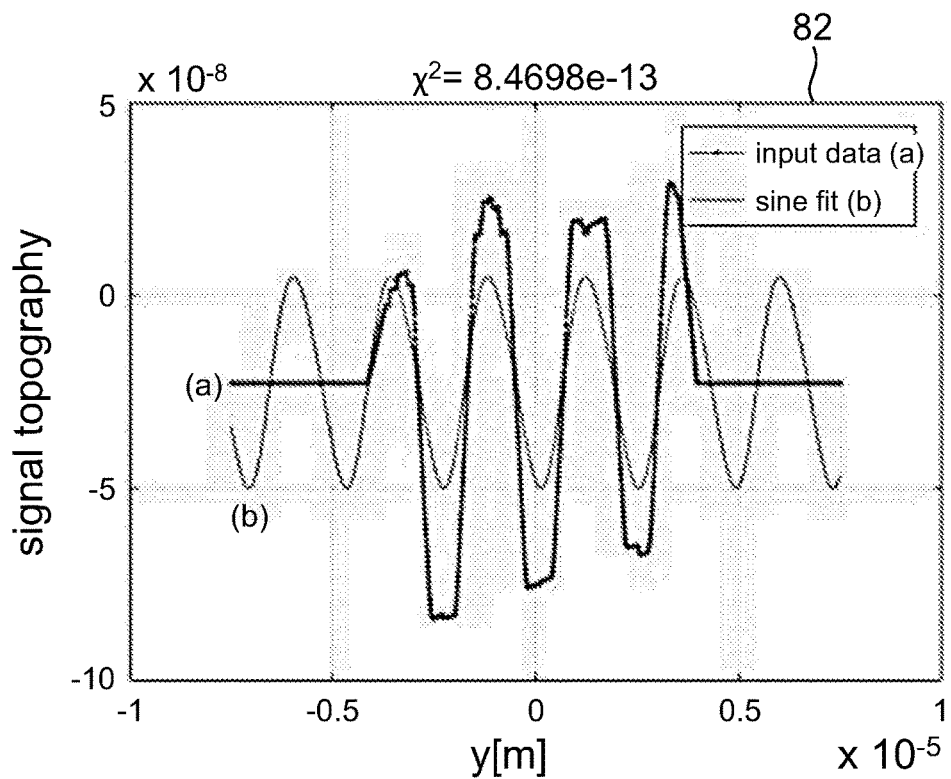
FIGS. 7A and 7B provide two examples of sine fits in a method in accordance with an embodiment of the invention.
Figure 7B:
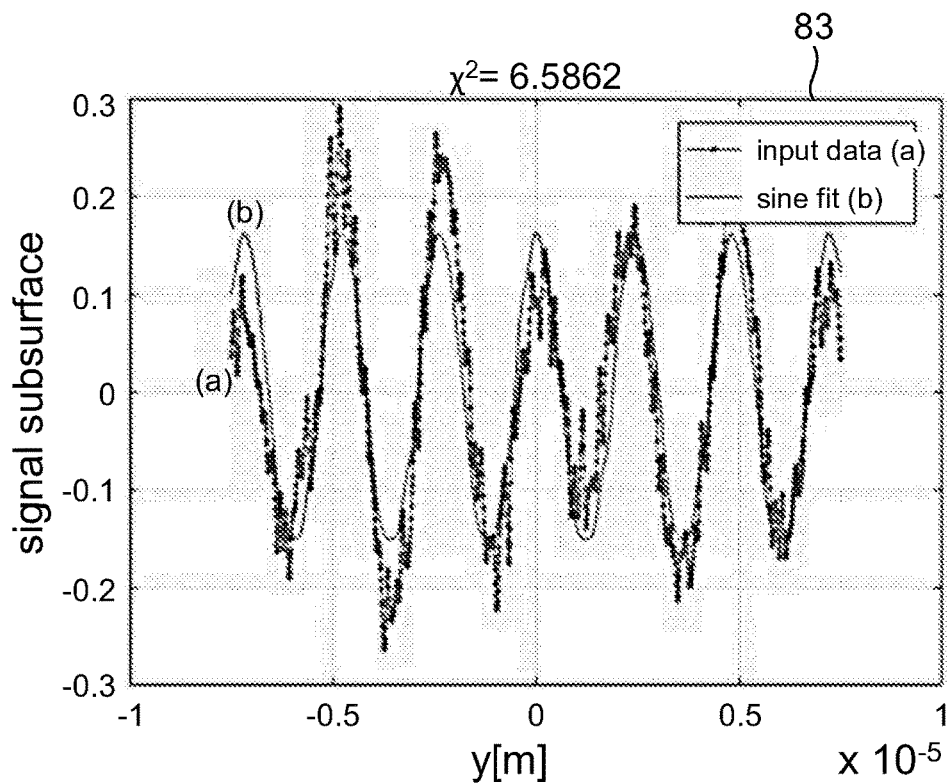

Optionally, in accordance with some embodiments, after the estimation in step 56, it is possible to perform a sine fit or other periodic function (e.g. a square signal for the topography) on all the estimated signals in step 57. The fitted periodic function is applied having a same periodicity as the spatial periodicity obtained from the estimation step. FIGS. 7A and 7B illustrate sine fits 82 and 83 for the topography signal (FIG. 7A) and the subsurface signal (FIG. 7B) respectively. The $_x2$ values represent the residual components of the fitting.

Optionally, as indicated by arrow 60 in FIG. 3, the method may thereafter reiterate in another cycle starting again in step 54, where instead of autocorrelation of the fitted periodic function (which would not provide any information) a cross-correlation is made between the actual signal and the fitted periodic function. This enables to improve the accuracy of the fit and to obtain a more accurate estimation of the periodicity characteristics.

Figure 8:
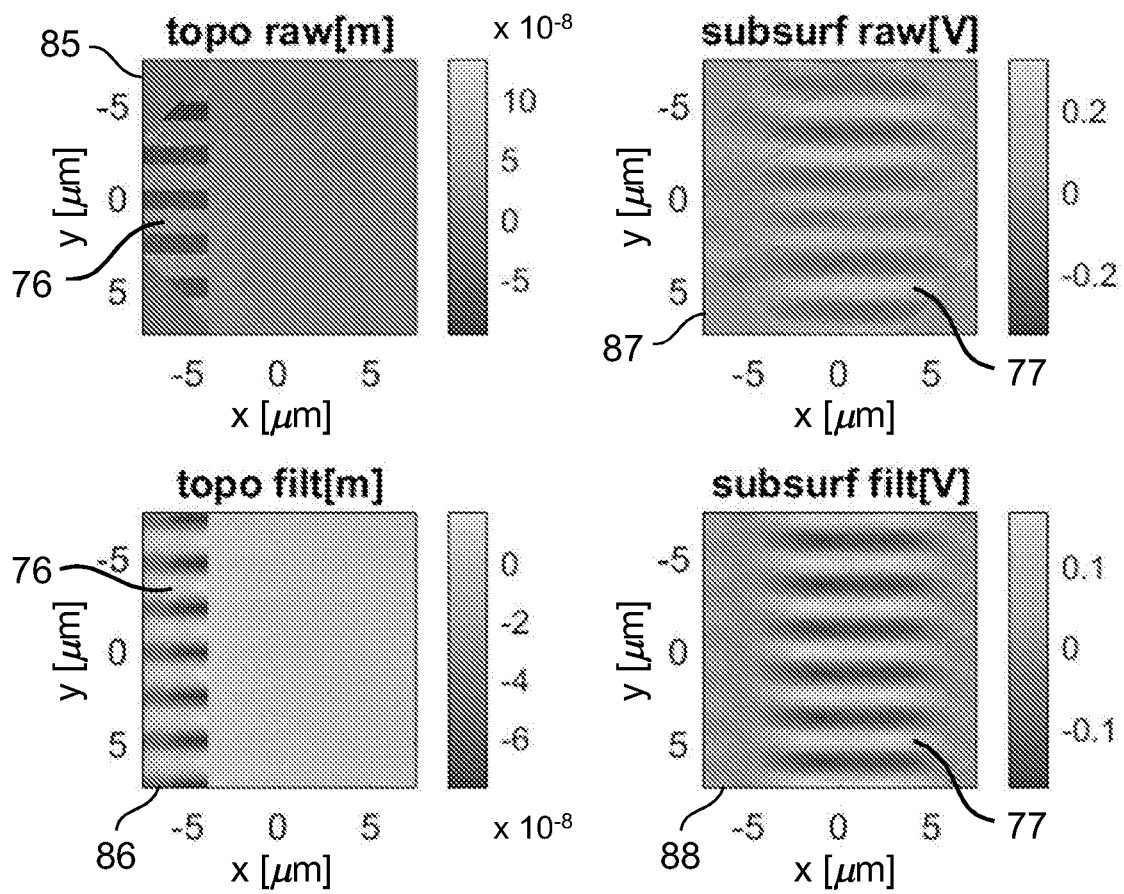
FIG. 8 shows raw and filtered visualizations of the topography and subsurface measurements, obtained using a method in accordance with an embodiment of the invention.

Furthermore, in optional step 58, the method may continue by creating a two-dimensional map that contains the fitted profiles, such as to obtain a visual representation of the overlay estimation. FIG. 8 provides images of the raw topography signal 22 (image 85), the topography signal 22 filtered using the method of the invention (image 86), the raw subsurface amplitude signal 26 (image 87) and the subsurface amplitude signal 26 filtered using the method of the invention (image 88). In particular the latter two images 87 and 88 show a remarkable improvement of the subsurface signal 26, which directly enables the accurate determination of subsurface feature dimensions (e.g. the width of bar shaped features 77.

Figure 9:
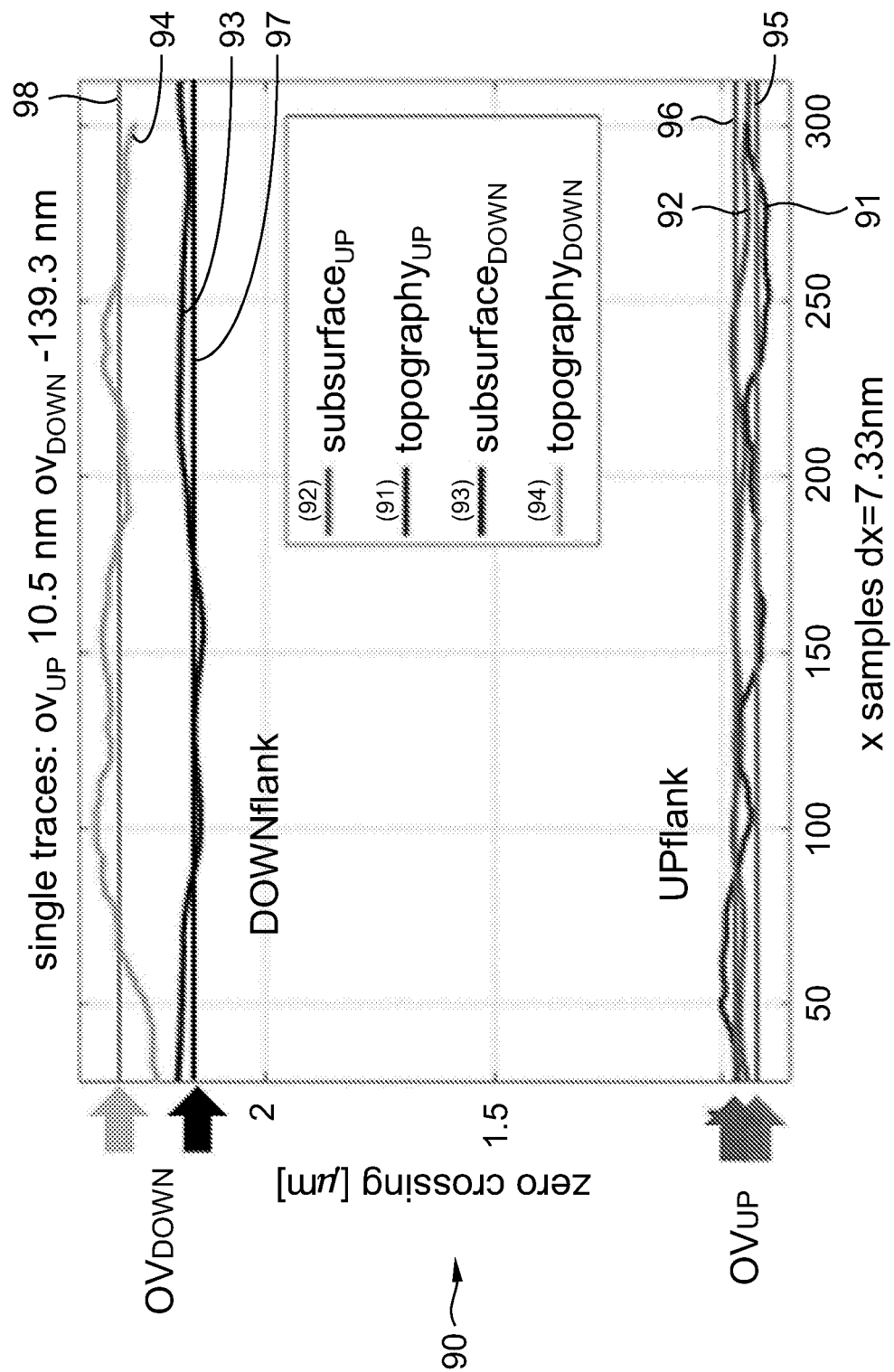
FIG. 9 schematically illustrates a determination of overlay error for two features in a test sample, based on a method in accordance with an embodiment.

Overlay and alignment may already be determined from the results of the estimation step 56, after a single run or one or more iterations, without such visualization. For determining overlay accuracy and correctness, it is possible to compare lines (one is enough but more increases the accuracy) between the topography and the subsurface channel result obtained. The overlay can be estimated with several possibilities: comparing the maxima or minima of the fitted signals, or extracting the zero-crossings (up or down). FIG. 9 provides an example of the latter. In FIG. 9, the zero crossings of bars 76 and 77 between approximately 1.0 and 2.2 micrometer in the y direction in the data underlying images 86 and 88 are plotted for all values of $x_i$ (i.e. all pixels in the x-direction) in graph 90. Plot 91 are the up-going zero crossings for the filtered topography signal 22, plot 92 are the up-going zero crossings for the filtered subsurface amplitude signal 26, plot 93 are the down-going zero crossings for the filtered topography signal 22 and plot 94 are the down-going zero crossings for the filtered subsurface amplitude signal 26. Furthermore, the average levels are indicated by average level 95 for the up-going zero crossings of the filtered topography signal 22, average level 96 for the up-going zero crossings of the filtered subsurface amplitude signal 26, average level 97 for the down-going zero crossings of the filtered topography signal 22 and average level 98 for the down-going zero crossings of the filtered subsurface amplitude signal 26. These levels clearly indicate the overlay mismatch (e.g. between levels 97 and 98) for the subject bars 76 and 77 investigated.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A method of determining one or more dimensions of subsurface features from a measurement of subsurface topography of a sample, wherein the measurement of the subsurface topography is obtained using a scanning probe microscopy system, and wherein the method comprises:
    applying, using a transducer, an acoustic input signal to the sample;
    sensing in a plurality of locations on a surface of the sample an acoustic output signal using a probe, the probe including a cantilever and a probe tip, wherein the probe tip is in contact with the surface, wherein the acoustic output signal is representative of acoustic waves responsive to the acoustic input signal that are measurable at the surface; and
    obtaining, for each location of the plurality of locations, a measurement value of the acoustic output signal, and providing a location dependent subsurface topography signal based on the measurement values of at least a part of the plurality locations, the at least part of the plurality locations including N locations;
wherein the subsurface features include one or more features having a spatial periodicity, and wherein the method further comprises:
    providing an autocorrelation matrix by performing, for each location of the at least part of the plurality of locations, a cross-correlation of the subsurface topography signal in respect of each further location of the at least part of the plurality of locations using a location-shifted version of the subsurface topography signal which is shifted over distance equal to the distance between the respective location and the further location, such as to yield the autocorrelation matrix having a size N*N;
    performing an Eigenvalue decomposition of the autocorrelation matrix for obtaining a plurality of Eigenvalues, and selecting from the Eigenvalues a subset of Eigenvalues having the largest values;
    constructing a frequency estimation function from the subset of Eigenvalues; and
    obtaining, from the frequency estimation function, at least one output value being indicative of the spatial periodicity.

2. The method according to claim 1, further including a step of fitting at least one periodic function having a same periodicity as the spatial periodicity for which the at least one output value is indicative such as to obtain a fitted periodic function.

3. The method according to claim 2, further including:
    calculating, for each location of the at least part of the plurality of locations and using the fitted periodic function, an expectation value of the acoustic output signal, such as to yield expectation values for at least said N locations;
    generating a cross-correlation matrix by performing, for each location of the at least part of the plurality of locations, a cross-correlation of the subsurface topography signal with each expectation value, such as to yield a cross-correlation matrix having a size N*N;
    performing an Eigenvalue decomposition of the cross-correlation matrix for obtaining a plurality of further Eigenvalues, and selecting from the further Eigenvalues a further subset of Eigenvalues having the largest values;
    constructing a further frequency estimation function from the further subset of Eigenvalues; and
    obtaining, from the further frequency estimation function, at least one further output value being indicative of the spatial periodicity.

4. The method according to claim 3, further comprising repeating the method steps one or more times to obtain an improved estimate of the spatial periodicity.

5. The method according to claim 2, wherein the method further includes using the fitted periodic function to determine one or more locations of at least one of a minimum, a maximum or a zero crossing of the fitted periodic function.

6. The method according to claim 2, wherein the fitted periodic function comprises a sine fit.

7. The method according to claim 1, further comprising calculating the one or more dimensions of the subsurface features based on the determined spatial periodicity.

8. The method according to claim 1, wherein the dimensions include at least one of a group comprising: a pitch of a periodic structure, a width of a subsurface feature, line width roughness, critical dimension, feature spacing.

9. A method of monitoring at least one of an overlay or an alignment between a first and a second layer of a semiconductor substrate using a scanning probe microscopy system, wherein the method comprises:
    scanning the substrate surface, using a probe tip of the scanning probe microscopy system, in at least one scanning direction, for obtaining a surface topography and a subsurface topography,
    wherein for obtaining the subsurface topography the method of claim 1 is performed, which further yields an output value being indicative of the spatial periodicity;
    the method further including:
    generating at least one pattern template and matching the measured surface topography with the at least one pattern template for determining a first candidate pattern to represent the measured first topography in the at least one scanning direction;
    obtaining a second candidate pattern to represent the measured subsurface topography in the at least one scanning direction wherein the second candidate pattern is obtained by fitting at least one periodic function having a same periodicity as the spatial periodicity;

determining, from the first candidate pattern, one or more feature characteristics of device features in the first topography;

determining, from the second candidate pattern, one or more feature characteristics of device features in the second topography; and calculating, using the determined feature characteristics of the first and second topography, one or more overlay parameters or alignment parameters.

10. A scanning probe microscopy system configured for carrying out the method of claim 1, the system comprising a substrate carrier for supporting a sample, the substrate carrier comprising a transducer for applying an acoustic input signal to the sample, the system further including a scan head comprising a probe, the probe including a cantilever and a probe tip, wherein at least one of the substrate carrier or the scan head comprises at least one actuator configured for scanning the probe relative to the sample such that the probe tip is in contact with the sample, and wherein the system further comprises a sensor for obtaining an acoustic output signal representative of acoustic waves responsive to the acoustic input signal that are measurable at the surface of the sample, for enabling to obtain a subsurface topography signal containing measurement values of at least N locations on the surface of the sample, wherein the system further comprises or is communicatively connected to an analysis system, and wherein the analysis system comprises a memory and a controller, wherein the memory is configured for storing instructions which when loaded into the memory enable the controller to determine one or more dimensions of subsurface features having a spatial periodicity, wherein to perform said determination the instructions enable the controller to perform the steps of:

providing an autocorrelation matrix by performing, for each location of the at least part of the plurality of locations, a cross-correlation of the subsurface topography signal in respect of each further location of the at least part of the plurality of locations using a location-shifted version of the subsurface topography signal which is shifted over distance equal to the distance between the respective location and the further location, such as to yield the autocorrelation matrix having a size N*N;

performing an Eigenvalue decomposition of the autocorrelation matrix for obtaining a plurality of Eigenvalues, and selecting from the Eigenvalues a subset of Eigenvalues having the largest values;

constructing a frequency estimation function from the subset of Eigenvalues; and obtaining, from the frequency estimation function, at least one output value being indicative of the spatial periodicity.

11. The scanning probe microscopy system according to claim 10, wherein the instructions further enable the controller to perform a step of fitting at least one periodic function having a same periodicity as the spatial periodicity for which the at least one output value is indicative such as to obtain a fitted periodic function.

12. The scanning probe microscopy system according to claim 11, wherein the instructions further enable the controller to perform the steps of:

calculating, for each location of the at least part of the plurality of locations and using the fitted periodic function, an expectation value of the acoustic output signal, such as to yield expectation values for at least said N locations;

generating a cross-correlation matrix by performing, for each location of the at least part of the plurality of locations, a cross-correlation of the subsurface topography signal with each expectation value, such as to yield a cross-correlation matrix having a size N*N;

performing an Eigenvalue decomposition of the cross-correlation matrix for obtaining a plurality of further Eigenvalues, and selecting from the further Eigenvalues a further subset of Eigenvalues having the largest values;

constructing a further frequency estimation function from the further subset of Eigenvalues; and obtaining, from the further frequency estimation function, at least one further output value being indicative of the spatial periodicity.

13. The scanning probe microscopy system according to claim 10, wherein the instructions further enable the controller to perform the steps of: calculating the one or more dimensions of the subsurface features based on the determined spatial periodicity.

14. The scanning probe microscopy system according to claim 13, wherein the dimensions include at least one of a group comprising: a pitch of a periodic structure, a width of a subsurface feature, line width roughness, critical dimension, feature spacing.

15. A non-transitory computer readable medium comprising instructions which, when loaded into a memory of an analysis system associated with a scanning probe microscopy system, enable a controller of the analysis system to perform the method according to claim 1.

* * * * *

UNITED STATES PATENT AND TRADEMARK OFFICE
CERTIFICATE OF CORRECTION

| | | |
|---|---|---|
| PATENT NO. | : 12,123,895 B2 | Page 1 of 1 |
| APPLICATION NO. | : 17/916622 | |
| DATED | : October 22, 2024 | |
| INVENTOR(S) | : Paul Zabbal | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 213 days.

Signed and Sealed this
Eighth Day of April, 2025

Coke Morgan Stewart
*Acting Director of the United States Patent and Trademark Office*